K. ALQUIST.
SPUR GEARING.
APPLICATION FILED JULY 18, 1911.
1,141,097.
Patented June 1, 1915.
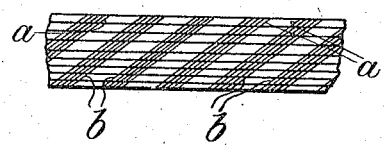
Fig. 1.
Fig. 2.
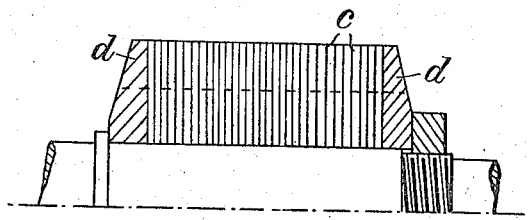
Fig. 3.
Fig. 4.
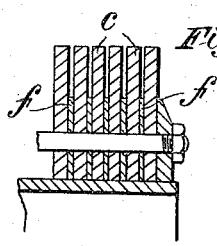
Fig. 5.
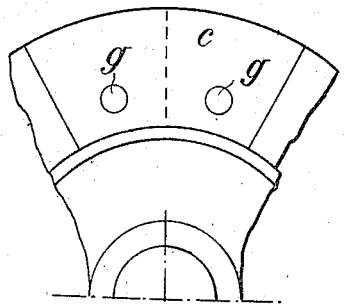
Fig. 6.
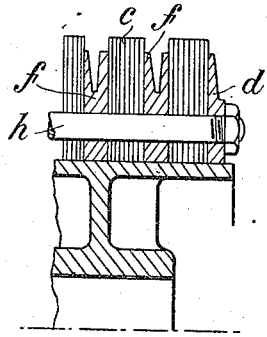
Fig. 7.
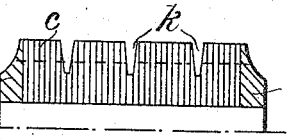
WITNESSES.
Howard D. Orr.
John N. Siggers
INVENTOR,
Karl Alquist,
by E. G. Siggers
ATTY.

UNITED STATES PATENT OFFICE.

KARL ALQUIST, OF RUGBY, ENGLAND.

SPUR-GEARING.

1,141,097.  Specification of Letters Patent.  Patented June 1, 1915.

Application filed July 18, 1911. Serial No. 639,210.

*To all whom it may concern:*

Be it known that I, KARL ALQUIST, a subject of the King of Sweden, residing at 147 Clifton road, Rugby, in the county of Warwick, Kingdom of England, have invented certain new and useful Improvements in or Relating to Spur-Gearing, of which the following is a specification.

My invention relates to spur gearing, and has for its object to insure a certain yielding or flexibility under pressure of the teeth of such gearing. In order to obtain this result I use a wheel rim, or a pinion, built up from a plurality of comparatively thin plates or laminations, made of practically incompressible material, and my invention broadly consists in having the teeth so formed or cut in the plates or laminations as to enable the plates or laminations to yield or bend elastically at right angles to their planes under the tooth pressure, for the resultant purpose of producing an elastic yielding of the surface of the teeth in mesh under the tooth pressure in the direction of rotation. The teeth are formed or cut helically or in an oblique direction across the laminations, and I use preferably an angle not over 70°, as measured between the direction of the teeth and the planes of the plates, in order to get a substantial component of the tooth pressure to effect the yielding of the plates or laminations and, at the same time, to get a substantial component of the yielding of the plates or laminations to produce the yielding of the surface of the teeth under pressure in the plane of rotation.

My invention is illustrated in the accompanying drawing, forming part of this specification in which—

Figure 1 is a developed surface of a laminated gear; Fig. 2 is an axial section of one-half of the gear; Fig. 3 is an enlarged transverse section of one-fourth of the gear showing undercutting of teeth; Fig. 4 is an enlarged axial section of my gear with the laminations arranged in groups; Fig. 5 is a fragmentary elevation showing segmental laminæ; Fig. 6 is a fragmentary longitudinal section of a slight modification; and Fig. 7 is a longitudinal section of another modification.

In Fig. 1, I have shown in developed plan the general principle of the invention as described above. A cylinder built up from plates or laminations (only part of the surface being shown) has teeth cut in an oblique direction across these laminations. The parallel lines *a* indicate the top, and the space between the lines *b* the foot of the teeth. In carrying out my invention I preferably place the plates or laminations either in planes inclined to the axis of the gear wheel or at right angles to the axis, and cut helical teeth out of the rim thus built up. The Figs. 2 to 7 show the latter method which is more convenient in practice for holding the plates.

In Fig. 2, I have shown a pinion built up from a number of plate rings *c*, and firmly clamped and compressed on the shaft between two stiffer end plates *d*. Keyways may be cut in the plates, so as to well fit keys in the shaft or center piece, and the teeth may then be milled out helically. In order to give more flexibility the teeth may be cut or milled out longer than would otherwise be necessary. This is indicated in Fig. 3, which shows a cross section of the pinion. The plates may, after the teeth have been cut, again be taken apart and the thickness of the plates, where forming the teeth, be somewhat reduced so that finally the plates may be well tightened up in the center without having a too hard pressure between the toothed portions of the plates, which would impair the flexibility. The pressure between the toothed portions of the plates will also automatically be somewhat reduced, and thereby the flexibility increased, by the small twist of the teeth which will take place after the teeth have been cut, due to the angle between the direction of the teeth and the surface of the plates. I may also arrange the teeth in groups, for instance by inserting, at certain intervals, ring plates without teeth between the other plates. Such an arrangement is shown in Fig. 4, where each group consists of a single comparatively thick spring plate of sufficient radial width to yield or bend sidewise in spite of this thickness. Between the plates are inserted the distance plates *f*. I may also use several plates or laminations, constituting a group between the distance plates *f*, as indicated in Fig. 6. Here the distance plates are of considerable thickness and increased flexibility is obtained by machining out peripheral grooves in the plates as shown, in order not to have to take apart and disturb the plates after the teeth have been cut. To retain this advantage, I may also make up the distance plates *f* of two concentric rings or laminations, the outer one, supporting the teeth during the milling operation, being of destructible material for instance paper, so that it can afterward be easily removed, or I may, as shown in Fig. 7, mill out grooves $k$ at certain intervals in the pack of laminations across the teeth after the teeth have been cut, no special distance plates then being wanted. Such grooves might, if desired, be cut spirally across the teeth. In order to add to the flexibility I may also make the end plates $d$ flexible by machining them down, after the teeth have been cut, to the shape indicated in Fig. 6.

It is generally better for the smooth running to have the driven wheel, which as a rule is the larger one, provided with the flexible teeth when only one of the wheels in mesh is built up according to this invention, and for large wheels it may be necessary to build up the laminations or plate rings in sections or segments so as to form a cylinder, and I may then secure the laminations by means of bolts or rivets passing through the sections or segments, which are suitably staggered, and the two end plate rings. This arrangement is shown in Figs. 5 and 6. In order to make the built up ring sections or segments absolutely unyielding in a radial direction from centrifugal stresses, care should be taken to have the holes $g$ properly reamed out, so as to well fit the bolts or rivets $h$, and the center should be provided with a slight taper, or some similar arrangement, so that the segments will be held perfectly tight when drawn up by the bolts $h$, or the laminated ring or cylinder may be shrunk on to its center.

I do not claim herein the method of manufacturing elastic helical gears involving the use of a removable or destructible spacing device, because this forms the subject matter of my divisional application, Serial No. 819,480, filed February 18, 1914.

What I claim as my invention and desire to secure by Letters Patent in the United States is:—

1. A gear wheel having a body portion built up of a plurality of peripherally toothed plates securely bound together at their central portions and with the outer portions unbound and slightly spaced apart so as to be free to yield at right angles to the planes of the plates, said plates being of substantial thickness as compared to the width of the space between them.

2. A gear wheel having a body portion built up of a plurality of plates rigidly supported at their central portions only, and slightly spaced apart at their peripheral portions, and helical teeth formed in the periphery of said body portions, said plates being of substantial thicknesses as compared to the width of the space between them.

3. A gear wheel having a body portion built up of a plurality of plates rigidly supported at their central portions only, and slightly spaced apart at their peripheral portions, and helical teeth formed in the periphery of said body portion, said plates being of substantial thickness as compared to the width of the space between them, and said teeth being longer than necessary to increase their flexibility.

4. A gear wheel having a body portion built up of a plurality of plates rigidly supported at their central portions and spaced apart at their outer portions, said plates being of substantial thickness as compared to the width of the space between them, and helical teeth formed in the periphery of said body portion.

5. A gear wheel comprising a plurality of circular laminations, space plates and end plates of less diameter than the laminations, said laminations being of substantial thickness as compared to the thickness of the spaced plates, means for rigidly clamping said laminations, space plates and end plates together, and helical teeth formed in the periphery of said laminations.

6. A gear wheel having a body portion built up of a plurality of tooth plates securely bound together at their central portions and with the toothed portions unbound and free to yield at right angles to the planes of the plates, and elastic spacing devices between plates.

7. A gear wheel having a body portion built up of a plurality of plates securely bound together at their central portions with their peripheral portions spaced apart so as to be free to yield at right angles to the planes of the plate, said plates being of substantial thickness as compared to the width of the space between them, and helical gear teeth formed in the peripheral portions of said plates, a portion of the body of each plate between the teeth and below their roots being cut away to increase the elasticity of the teeth in the plane of the plate.

8. A gear wheel having a body portion built up of a plurality of tooth plates arranged in groups securely bound together at their central portions and with the toothed portions unbound and spaced slightly apart so as to be free to yield laterally of the planes of the plates, a spacing device between each two groups, and a support on which the plates and spacing device are mounted.

In testimony whereof I have hereunto set my hand in presence of two subscribing witnesses this sixth day of July, 1911.

KARL ALQUIST.

Witnesses:
MARGARET B. PAXTON,
AX. BREMBERG.

It is hereby certified that in Letters Patent No. 1,141,097, granted June 1, 1915, upon the application of Karl Alquist, of Rugby, England, for an improvement in "Spur-Gearing," an error appears in the printed specification requiring correction as follows: Page 2, line 60, for the word "thicknesses" read *thickness;* and that the said Letters Patent should be read with this correction therein that the same may conform to the record of the case in the Patent Office.

Signed and sealed this 27th day of July, A. D., 1915.

[SEAL.]

R. F. WHITEHEAD,
*Acting Commissioner of Patents.*